United States Patent
Hama et al.

(10) Patent No.: US 8,790,849 B2
(45) Date of Patent: Jul. 29, 2014

(54) MANUFACTURING METHOD FOR ELECTRODE CATALYST LAYER, MANUFACTURING METHOD FOR MEMBRANE ELECTRODE ASSEMBLY, AND MANUFACTURING METHOD FOR FUEL CELL

(75) Inventors: Yuichiro Hama, Nagoya (JP); Takayoshi Doi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 13/318,383

(22) PCT Filed: Apr. 8, 2010

(86) PCT No.: PCT/IB2010/000765
§ 371 (c)(1),
(2), (4) Date: Nov. 1, 2011

(87) PCT Pub. No.: WO2010/133930
PCT Pub. Date: Nov. 25, 2010

(65) Prior Publication Data
US 2012/0052414 A1    Mar. 1, 2012

(30) Foreign Application Priority Data
May 21, 2009    (JP) .................. 2009-123192

(51) Int. Cl.
| H01M 8/00 | (2006.01) |
| H01M 8/04 | (2006.01) |
| H01M 4/92 | (2006.01) |
| H01M 4/62 | (2006.01) |
| B05D 5/12 | (2006.01) |
| B05D 7/22 | (2006.01) |

(52) U.S. Cl.
USPC ........... 429/535; 429/434; 429/524; 429/530; 429/532; 427/115; 427/230; 427/237; 977/742

(58) Field of Classification Search
USPC .......... 429/434, 524, 530, 532, 535; 427/115, 427/230, 237; 977/742
See application file for complete search history.

(56) References Cited

U.S. PATENT DOCUMENTS 4,970,093 A    11/1990  Sievers et al.
5,789,027 A     8/1998  Watkins et al.
(Continued)

FOREIGN PATENT DOCUMENTS

CN    101405908    4/2009
JP    2000-17442   1/2000
(Continued)

OTHER PUBLICATIONS

International Search Report in International Application No. PCT/IB2010/000765; Mailing Date: Jun. 24, 2010.
(Continued)

*Primary Examiner* — Muhammad Siddiquee
(74) *Attorney, Agent, or Firm* — Finnegan, Henderson, Farabow, Garrett & Dunner, LLP (57) ABSTRACT

A manufacturing method for an electrode catalyst layer includes: containing a conductive carrier on which a catalyst is supported, a substrate, an electrolyte resin and a supercritical fluid inside a closed container (S102 to S106); and cooling the substrate to form an electrode catalyst layer, having the conductive carrier on which the catalyst is supported and the electrolyte resin, on the substrate (S 108).

7 Claims, 8 Drawing Sheets

(56) References Cited

U.S. PATENT DOCUMENTS

| | | | |
|---|---|---|---|
| 2004/0018416 A1* | 1/2004 | Choi et al. | 429/44 |
| 2006/0093741 A1* | 5/2006 | Chen et al. | 427/248.1 |
| 2007/0042259 A1* | 2/2007 | Fan et al. | 429/40 |
| 2008/0020261 A1* | 1/2008 | Hendricks et al. | 429/40 |
| 2008/0220244 A1* | 9/2008 | Wai et al. | 428/328 |
| 2009/0004568 A1* | 1/2009 | Hirose et al. | 429/221 |
| 2010/0075201 A1 | 3/2010 | Nakanishi et al. | |
| 2011/0008617 A1* | 1/2011 | Hata et al. | 428/341 |
| 2012/0052414 A1 | 3/2012 | Hama et al. | |
| 2012/0088650 A1 | 4/2012 | Hama et al. | |

FOREIGN PATENT DOCUMENTS

| | | |
|---|---|---|
| JP | 2005-203332 | 7/2005 |
| JP | 2008-146860 | 6/2008 |
| JP | 2006-273613 | 10/2008 |
| JP | 2008-270053 | 11/2008 |
| JP | 2011-3531 | 1/2011 |
| WO | WO 2005/069955 A | 8/2005 |
| WO | WO 2006/080702 A1 | 8/2006 |

OTHER PUBLICATIONS

Written Opinion of the International Searching Authority in International Application No. PCT/IB2010/000765; Mailing Date: Jun. 24, 2010.

Applicant's Response in International Application No. PCT/IB2010/000765 (Mar. 18, 2011).

* cited by examiner

MANUFACTURING METHOD FOR ELECTRODE CATALYST LAYER, MANUFACTURING METHOD FOR MEMBRANE ELECTRODE ASSEMBLY, AND MANUFACTURING METHOD FOR FUEL CELL

CROSS-REFERENCE TO RELATED APPLICATIONS

This application is a national phase application of International Application No. PCT/IB2010/000765, filed Apr. 8, 2010, and claims the priority of Japanese Application No. 2009-123192, filed May 21, 2009, the contents of both of which are incorporated herein by reference.

BACKGROUND OF THE INVENTION

1. Field of the Invention

The invention relates to a manufacturing method for an electrode catalyst layer, a membrane electrode assembly and a fuel cell.

2. Description of the Related Art

Some of fuel cells use a membrane electrode assembly (MEA) in which electrode catalyst layers are respectively bonded to both surfaces of an electrolyte membrane. Each electrode catalyst layer includes a carrier, on which a catalyst is supported, and an electrolyte resin. Electrode reaction occurs at a so-called three-phase interface via the catalyst. At the three-phase interface, the passage of gas, the electrolyte resin and the carrier on which the catalyst is supported are in contact with one another. Therefore, the catalyst is desirably located at the three-phase interface. In addition, the electrolyte resin is desirably formed uniformly on the carrier.

For example, when vertically-aligned carbon nanotubes (hereinafter, also referred to as "vertically-aligned CNTs") are used as a carrier, there has been suggested a technique that electrolytic solution in which electrolyte resin is dissolved in alcohol is dripped onto carbon nanotubes (hereinafter, also referred to as "CNTs") and then dried to coat the surfaces of the CNTs with the electrolyte resin (see, for example, Japanese Patent Application Publication No. 2005-203332 (JP-A-2005-203332).

However, when the CNTs are long or when a distance between the adjacent CNTs is short, it is difficult for the electrolytic solution to penetrate into the back of a gap between the adjacent CNTs, so there is a possibility that the electrolyte resin cannot be formed uniformly on the surfaces of the CNTs.

Note that such a problem does not occur only when CNTs are used as a carrier, and also occurs, for example, when particles of carbon black, or the like, are used as a carrier.

SUMMARY OF THE INVENTION

The invention provides a technique for improving uniformity of electrolyte resin formed around a carrier, on which catalyst is supported, in an electrode catalyst layer that is used in a fuel cell.

A first aspect of the invention relates to a manufacturing method for an electrode catalyst layer. The manufacturing method includes: containing a conductive carrier on which a catalyst is supported, a substrate, an electrolyte resin and a supercritical fluid inside a closed container; and cooling the substrate to form the electrode catalyst layer, having the conductive carrier on which the catalyst is supported and the electrolyte resin, on the substrate.

By containing the electrolyte resin and the supercritical fluid inside the closed container, the electrolyte resin is dissolved (dispersed) in the supercritical fluid. Then, the substrate is cooled to cool the supercritical fluid therearound to thereby change from a supercritical state. Thus, the electrolyte resin precipitates. For example, as the conductive carrier on which the catalyst is supported is formed on the substrate, it is possible to improve uniformity of the electrolyte resin formed around the conductive carrier on which the catalyst is supported. In addition, for example, when particles, such as carbon black, are dispersed in the supercritical fluid as the conductive carrier as well, as the substrate is cooled and then the temperature around the substrate decreases, the temperature of particles, such as carbon black, also decreases. Thus, the electrolyte resin precipitates on the conductive carrier. Therefore, it is possible to improve uniformity of the electrolyte resin formed around the conductive carrier on which the catalyst is supported.

The conductive carrier may be a vertically-aligned material that is substantially vertically formed on the substrate, and the substrate may be cooled to cool the vertically-aligned material to a temperature lower than or equal to a critical point of the supercritical fluid.

Furthermore, the vertically-aligned material may be a vertically-aligned carbon nanotube.

With the above aspect, the electrolyte resin precipitates around the vertically-aligned material, so it is possible to improve uniformity of the electrolyte resin formed around the carrier on which the catalyst is supported. In addition, when the vertically-aligned material is used, reaction gas flows through air gaps formed by the plurality of vertically-aligned materials, so the reaction gas is smoothly supplied to the catalyst arranged near a three-phase interface. As a result, it is possible to improve the effective utilization rate of the catalyst.

The supercritical fluid may be a supercritical fluid of trifluoromethane.

As the pressure of trifluoromethane increases, the trifluoromethane has an increased dielectric constant and a higher polarity, so the trifluoromethane dissolves the electrolyte resin more easily. Thus, in comparison with the case where carbon dioxide is used as a supercritical fluid, it is possible to easily dissolve (disperse) the electrolyte resin.

Note that the aspect of the invention may be implemented in various forms, and may be, for example, implemented in a manufacturing method for a membrane electrode assembly, a manufacturing method for a fuel cell, an electrode catalyst layer, a membrane electrode assembly, a fuel cell, a fuel cell system provided with a fuel cell, a vehicle equipped with a fuel cell system, or the like.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A. First Embodiment
A1. Configuration of Fuel Cell

Figure 1:
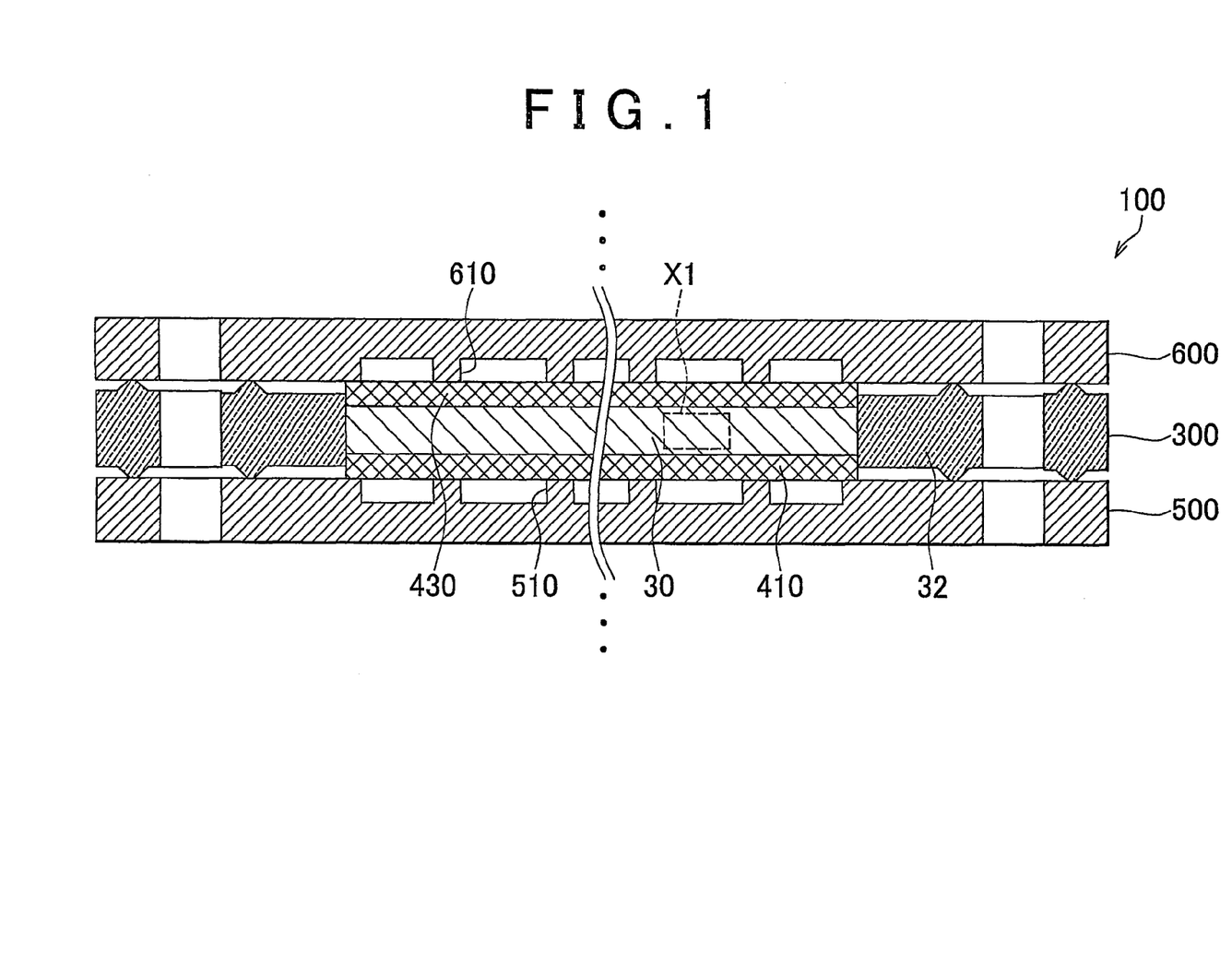
FIG. 1 is a cross-sectional view that schematically shows the cross-sectional configuration of a fuel cell according to a first embodiment of the invention.

FIG. 1 is a cross-sectional view that schematically shows the cross-sectional configuration of a fuel cell 100 according to a first embodiment of the invention. The fuel cell 100 is a polymer electrolyte fuel cell. The fuel cell 100 uses hydrogen and air to generate electric power.

As shown in FIG. 1, the fuel cell 100 has an anode-side gas diffusion layer 410 and an anode-side separator 500 that are stacked in the stated order on an anode side of a seal-integrated membrane electrode assembly (MEA) 300, and has a cathode-side gas diffusion layer 430 and a cathode-side separator 600 that are stacked in the stated order on a cathode side of the seal-integrated MEA 300. FIG. 1 shows part of a portion in which a plurality of the seal-integrated MEAs 300, the anode-side gas diffusion layers 410, the anode-side separators 500, the cathode-side gas diffusion layers 430 and the cathode-side separators 600 are stacked. The other portions are omitted from the drawing. Hereinafter, the anode-side separator 500 and the cathode-side separator 600 are also collectively termed as the separators 500 and 600.

Note that a coolant separator in which a coolant passage for flowing coolant is formed is arranged at predetermined intervals between the anode-side separator 500 and the cathode-side separator 600 (not shown). Coolant flows through the inside of the coolant separators to remove heat generated by electrode reaction of the fuel cell 100, thus maintaining the internal temperature of the fuel cell 100 within a predetermined range.

The fuel cell 100 is manufactured in the following process. First, an electrode catalyst layer 10 manufactured in accordance with a manufacturing method for an electrode catalyst layer, which will be described later, is transferred onto each of the surfaces of the electrolyte membrane 20 to thereby manufacture an MEA 30. A seal member 32 is formed at an outer periphery of the MEA 30 to manufacture the seal-integrated membrane electrode assembly (MEA) 300. The anode-side gas diffusion layer 410 and the anode-side separator 500 are stacked in the stated order on an anode side of the seal-integrated MEA 300, and the cathode-side gas diffusion layer 430 and the cathode-side separator 600 are stacked in the stated order on a cathode side of the seal-integrated MEA 300. Thus, a fuel cell module is formed. Then, a plurality of (for example, 400) the fuel cell modules are stacked on top of each other. After that, a current collector plate (not shown), an insulating plate (not shown) and an end plate (not shown) are stacked in the stated order on each end of the plurality of stacked fuel cell modules. In this way, the components are arranged. Then, the components that constitute the fuel cell 100 is fastened together by a tension plate, a tension rod, and the like, in a state where a predetermined pressing force is applied in a stacking direction in which the fuel cell modules are stacked. Thus, the stacked state of the fuel cell 100 is maintained, thereby finishing the fuel cell 100.

Each anode-side separator 500 has a plurality of protruding ribs 510 on a surface facing the anode-side gas diffusion layer 410. Similarly, each cathode-side separator 600 has a plurality of protruding ribs 610 on a surface facing the cathode-side gas diffusion layer 430. The pair of separators 500 and 600 sandwich the MEA 30 from both sides to form passages through which hydrogen flows as anode gas and passages through which air flows as cathode gas.

Air supplied to the fuel cell 100 flows into the cathode-side gas diffusion layer 430 through the passages formed by the ribs 610 of the cathode-side separator 600, and flows through the cathode-side gas diffusion layer 430 while being supplied to the MEA 30 to be used for electrode reaction. Similarly, hydrogen supplied to the fuel cell 100 flows into the anode-side gas diffusion layer 410 through the passages formed by the ribs 510 of the anode-side separator 500, and flows through the anode-side gas diffusion layer 410 while flowing through the inside of the fuel cell 100 to be used for electrode reaction.

Note that, in the present embodiment, the pair of separators 500 and 600 are formed using a stainless steel flat plate; instead, they may be formed using another metal flat plate, such as titanium and aluminum, or may be formed using a carbon flat plate. In addition, the shape of each of the pair of separators 500 and 600 is not limited to the shape having the above described ribs.

In addition, in the present embodiment, carbon felt applied with water repellent treatment is used for the anode-side gas diffusion layer 410 and the cathode-side gas diffusion layer 430. Note that, in the present embodiment, the anode-side gas diffusion layer 410 and the cathode-side gas diffusion layer 430 are respectively arranged between the MEA 30 and the separator 500 and between the MEA 30 and the separator 600; instead, it may be configured so that no anode-side gas diffusion layer 410 or cathode-side gas diffusion layer 430 is provided, that is, the MEA 30 and the separators 500 and 600 are in contact with each other.

Figure 2:
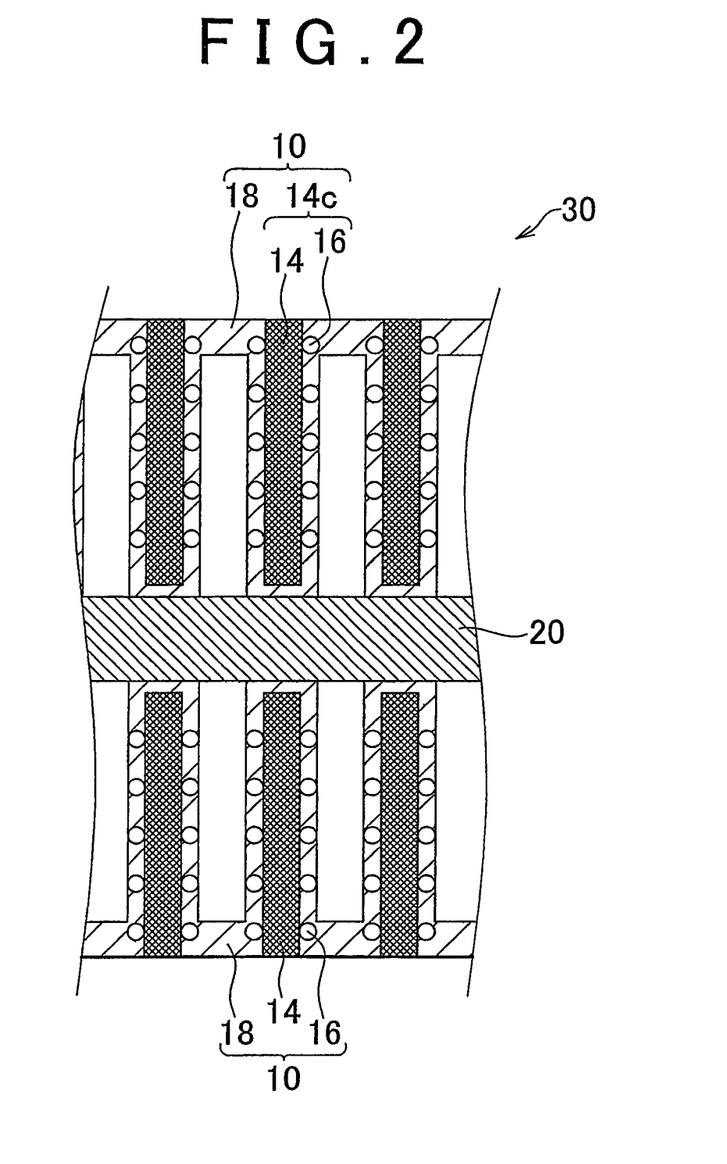
FIG. 2 is an enlarged cross-sectional view that shows an X1 portion in FIG. 1.

FIG. 2 is an enlarged cross-sectional view that shows an X1 portion in FIG. 1. As shown in FIG. 2, the MEA 30 has the electrode catalyst layers 10 stacked respectively on both surfaces of the electrolyte membrane 20. In the present embodiment, the electrolyte membrane 20 is formed using a polymer electrolyte membrane (Nafion (trademark) membrane: NRE212) formed of a fluorosulfonate polymer as a proton conducting solid polymer material. Note that the polymer electrolyte membrane is not limited to Nafion (trademark); instead, for example, it may be another fluorosulfonate membrane, such as Aciplex (trademark) and Flemion (trademark). Alternatively, the polymer electrolyte membrane may be, for example, a fluorophosphonate membrane, a fluorosulfonate membrane, a fluorohydrocarbon grafted membrane, a hydrocarbon grafted membrane, an aromatic membrane, or the like. In addition, the polymer electrolyte membrane may be a composite polymeric membrane that contains a reinforcement material, such as PTFE and polyimide, and that has a reinforced mechanical characteristic.

Each electrode catalyst layer 10 includes platinum particles 16 (hereinafter, also referred to as "Pt particles 16") as a catalyst, carbon nanotubes 14 (hereinafter, also referred to as "CNTs 14") as a conductive carrier that supports the catalyst, and an electrolyte resin 18. Each electrode catalyst layer 10 is formed by coating the CNTs 14, on which the Pt particles 16 are supported (hereinafter, also referred to as "Pt carrier CNTs 14c"), with the electrolyte resin 18. In the present embodiment, Nafion (trademark) is used as the electrolyte resin 18.

In the present embodiment, the linear CNTs 14 are used as the conductive carrier, so the wide area of a supporting surface is ensured to make it possible to densely support the catalyst (Pt particles 16). In addition, the Pt supported CNTs 14c are coated with the electrolyte resin 18, so the CNTs 14 are aligned substantially vertically with respect to the electrolyte membrane 20 (FIG. 2). Reaction gas flows through air gaps formed by the plurality of CNTs 14, so the reaction gas is smoothly supplied to the catalyst (Pt particles 16) arranged near the three-phase interface. As a result, it is possible to improve the effective utilization rate of the catalyst.

In addition, the CNTs 14 that serves as the conductive carrier according to the present embodiment are aligned substantially vertically with respect to the electrolyte membrane 20 as described above. Thus, not only the supply of reaction gas but also the drain of water produced by electrochemical reaction becomes smooth. In the present embodiment, the vertically-aligned CNTs that are substantially vertically aligned on a substrate, which will be described later, are used to manufacture the MEA 30 in which the CNTs 14 serving as the conductive carrier are aligned substantially vertically with respect to the electrolyte membrane 20.

The vertically-aligned CNTs are formed on a substrate (see FIG. 3 and FIG. 6A to FIG. 6C) by chemical vapor deposition (CVD). In the present embodiment, the substrate 12 is made of silicon; however, the material of the substrate 12 is not limited to silicon. Instead, another material, such as stainless steel and aluminum, on which CNTs are appropriately deposited substantially vertically on the substrate 12, may be used. Note that the vertically-aligned CNTs may be produced in such a manner that simple CNTs produced by arc discharge, laser vapor deposition or gas-phase fluidization are vertically aligned on the substrate.

In addition, in the present embodiment, the Pt particles 16 are supported on the surfaces of the CNTs 14 by wet process. Instead, the Pt particles 16 may be supported on the surfaces of the CNTs 14 by another known method, such as dry process. In the case of wet process, it is desirable that a solution in which a proper amount of platinum chemical, such as platinic chloride and platinic nitrate solution, is dissolved in alcohol, such as ethanol, (hereinafter, also referred to as "solvent-diluted platinum chemical") is applied to the surfaces of the CNTs 14 and is then subjected to heat treatment at 150° C. or above in an atmosphere of hydrogen. Applying the solvent-diluted platinum chemical to the surfaces of the CNTs 14 may employ various methods, such as immersing the CNTs 14 in the solvent-diluted platinum chemical and dripping or spraying the solvent-diluted platinum chemical to the surfaces of the CNTs 14. In addition, in the case of dry process, applying the solvent-diluted platinum chemical to the surfaces of the CNTs 14 may employ electron-beam evaporation, sputtering, electrostatic painting, or the like.

Note that, in the present embodiment, platinum (platinum particles 16) is used as a catalyst; other than platinum, one or two or more metals selected from various metals, such as rhodium, palladium, iridium, osmium, ruthenium, rhenium, gold, silver, nickel, cobalt, lithium, lanthanum, strontium, and yttrium, may be used as a catalyst. In addition, an alloy of a combination of two or more of the above metals may also be used as a catalyst. In addition, the polymeric resin (Nafion (trademark)) is used as the electrolyte resin 18 as in the case of the electrolyte membrane 20. Instead, a polymeric resin different from that of the electrolyte membrane 20 may be used.

A2. Manufacturing Method for Electrode Catalyst Layer

Figure 3:
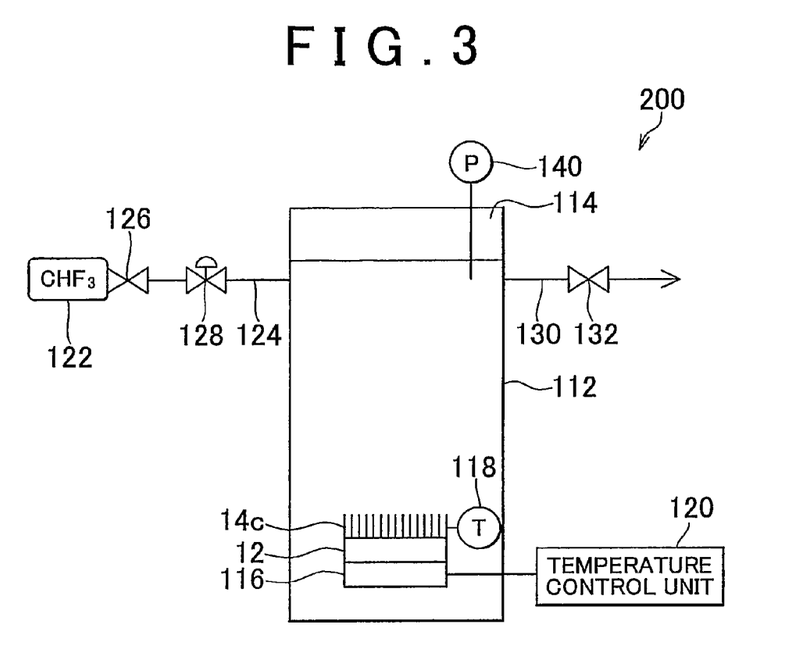
FIG. 3 is a schematic view that schematically shows a manufacturing equipment for an electrode catalyst layer.

FIG. 3 is a schematic view that schematically shows a manufacturing equipment for an electrode catalyst layer. An electrode catalyst layer manufacturing equipment 200 includes a reactor 112 that serves as a closed container, a trifluoromethane ($CHF_3$) supply system, a trifluoromethane discharge system, a pressure gauge 140, a cooling device 116, a temperature sensor 118 and a temperature control unit 120. The reactor 112 is hermetically closed by a lid 114. In the present embodiment, SCW-95 produced by OM Lab-tech Co., Ltd. is used as the reactor 112. Instead, another reactor may be used.

The trifluoromethane supply system mainly includes a trifluoromethane tank 122, a trifluoromethane gas supply passage 124, and a pressure regulating valve 128 provided in the trifluoromethane gas supply passage 124. The trifluoromethane tank 122 includes a shut-off valve 126. By opening or closing the shut-off valve 126, the trifluoromethane gas is supplied from the trifluoromethane tank 122 or the supply of the trifluoromethane gas is stopped.

Trifluoromethane gas stored in the trifluoromethane tank 122 is discharged to the trifluoromethane gas supply passage 124 connected to the trifluoromethane tank 122. After that, the trifluoromethane gas is regulated to a predetermined pressure by the pressure regulating valve 128, and is supplied to the reactor 112.

The trifluoromethane discharge system mainly includes trifluoromethane gas discharge passage 130 and an discharge valve 132 provided in the trifluoromethane gas discharge passage 130. As will be described later, after the electrode catalyst layer 10 has been formed on the substrate 12, as the discharge valve 132 is opened, trifluoromethane inside the reactor 112 is discharged to the outside of the reactor 112 as trifluoromethane gas.

In the present embodiment, when the reactor 112 is filled with trifluoromethane gas, first, trifluoromethane gas is introduced into the reactor 112 while opening the discharge valve 132 to replace air inside the reactor 112 with trifluoromethane. In addition, in the present embodiment, a worker who manufactures the electrode catalyst layer 10 visually checks the pressure gauge 140 while adjusting the pressure inside the reactor 112 to a predetermined pressure. Note that the pressure inside the reactor 112 may be automatically controlled.

The temperature sensor 118 has a thermocouple. The temperature sensor 118 measures the temperature of the CNTs 14, and outputs a temperature measurement signal to the temperature control unit 120. The cooling device 116 has a Peltier device. The substrate 12 is arranged on the cooling device 116. The cooling device 116 is controlled by the temperature control unit 120 to make it possible to cool the substrate 12. The temperature control unit 120 controls the cooling device 116 on the basis of the temperature measurement signal input from the temperature sensor 118. The temperature control unit 120 controls the cooling device 116 so that the temperature of the carbon nanotubes 14 becomes a predetermined temperature.

Figure 4:
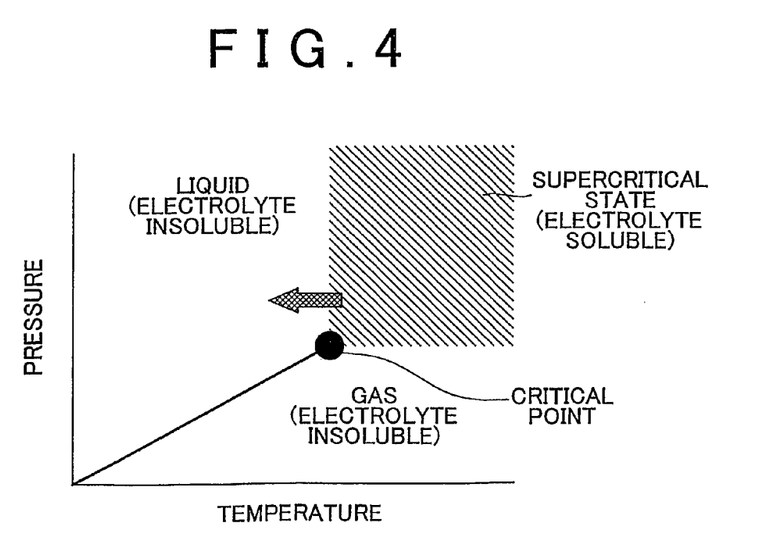
FIG. 4 is a map that illustrates a change of the state of trifluoromethane.

FIG. 4 is a map that illustrates a change of the state of trifluoromethane. A supercritical state is the state of a substance placed under a temperature and pressure equal to or higher than a critical point. A supercritical fluid has both the property of gas (diffusibility) and the property of liquid (solubility). In the manufacturing method for a catalyst electrode layer according to the present embodiment, electrolyte resin is dissolved in trifluoromethane in a supercritical state (hereinafter, also referred to as "supercritical trifluoromethane"). As indicated by the arrow in the map, as the temperature of supercritical trifluoromethane is decreased, the supercritical trifluoromethane changes from the supercritical state to become liquid trifluoromethane. The electrolyte resin does not dissolve in the liquid trifluoromethane, so the electrolyte resin precipitates.

Figure 5:
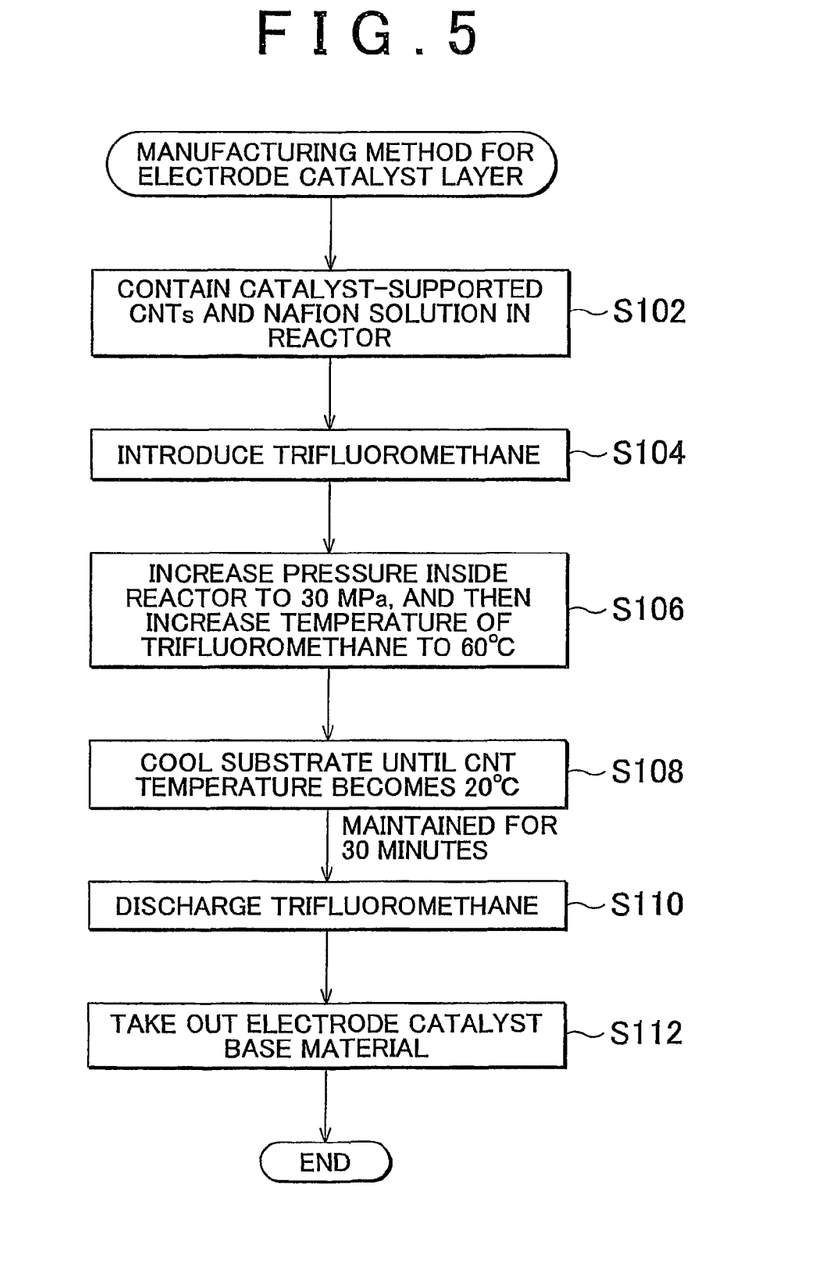
FIG. 5 is a flowchart that shows the flow of a manufacturing process for an electrode catalyst layer.
Figure 6A:
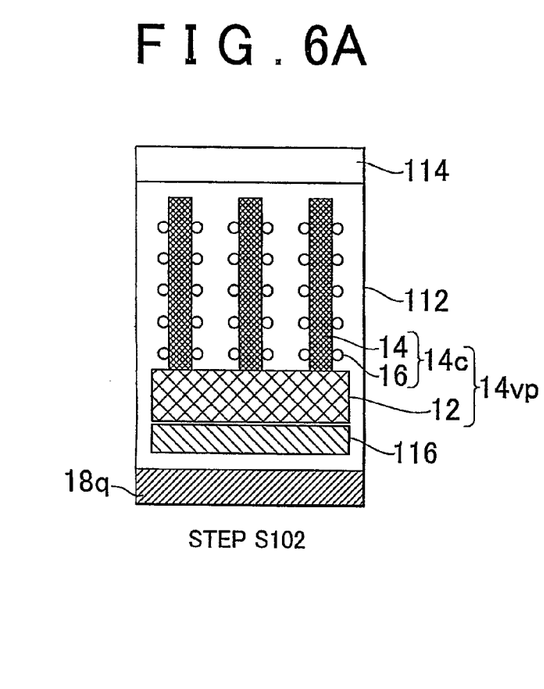
FIG. 6A to FIG. 6C are views that conceptually show parts of the manufacturing process for an electrode catalyst layer.

FIG. 5 is a flowchart that shows the flow of a manufacturing process for an electrode catalyst layer. FIG. 6A to FIG. 6C are views that conceptually show parts of the manufacturing process for an electrode catalyst layer. In step S102 (FIG. 6A), Nafion solution 18q is contained in the reactor 112. In addition, Pt-supported vertically-aligned CNTs 14vp, in which Pt-supported CNTs 14c are substantially vertically aligned on the substrate 12, are arranged on the cooling device 116 inside the reactor 112. Then, the reactor 112 is hermetically closed by the lid 114. In the present embodiment, Nafion solution DE2020CS is diluted with ethanol so that Nafion has a concentration of 3 wt %, and the diluted Nafion solution is used as the Nafion solution 18q.

In step S104, the shut-off valve 126 is opened, and the pressure regulating valve 128 is regulated to thereby introduce trifluoromethane gas into the reactor 112 at a predetermined pressure, and the discharge valve 132 is opened to replace air inside the reactor 112 with trifluoromethane. Note that, as a predetermined period of time elapses and the reactor 112 is filled with trifluoromethane, the discharge valve 132 is closed.

Figure 6B:
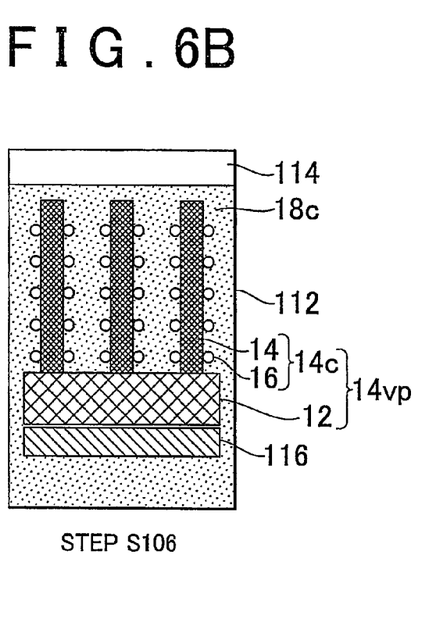

In step S106, the pressure inside the reactor 112 is increased to 30 MPa, and then the temperature of trifluoromethane is increased to 60° C. Trifluoromethane has a critical point at 25.9° C. and 4.8 MPa, so, in step S106, trifluoromethane enters a supercritical state (becomes supercritical trifluoromethane). The supercritical trifluoromethane has an increased dielectric constant and, therefore, has a high polarity. Thus, the supercritical trifluoromethane is able to dissolve the electrolyte resin 18 therein. Therefore, the electrolyte resin 18c dissolved in the supercritical trifluoromethane is dispersed inside the reactor 112 (FIG. 6B).

In step S108, until the temperature of the CNTs 14 becomes 20° C., the substrate 12 is cooled by the cooling device 116. Because the CNTs 14 have a high thermal conductivity, when the substrate 12 is cooled, the CNTs 14 are also cooled. As the CNTs 14 are cooled to a temperature lower than or equal to the critical point of trifluoromethane, trifluoromethane around the CNTs 14 changes from a supercritical state into a liquid state (FIG. 4). The electrolyte resin 18 does not dissolve in the liquid trifluoromethane, so the electrolyte resin 18 precipitates on the CNTs 14.

Figure 6C:
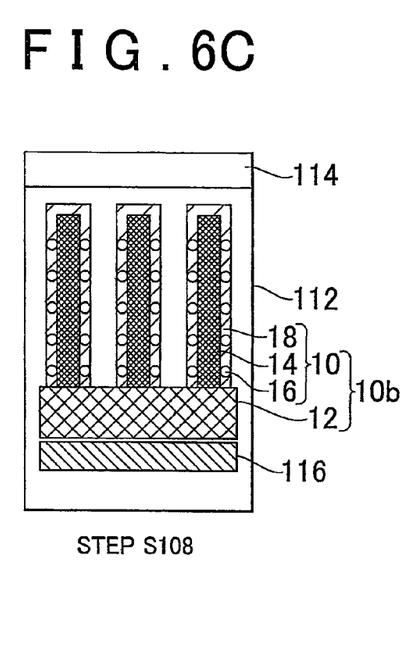

After that, the temperature of the CNTs 14 is maintained at 20° C. for 30 minutes. In this way, by maintaining the temperature of the CNTs 14 at a temperature lower than or equal to the critical point of trifluoromethane for a predetermined period of time, the electrolyte resin 18 gradually precipitates on the CNTs 14, thus making it possible to form an electrolyte resin layer having a desired thickness on the CNTs 14 (FIG. 6C).

In step S110, the discharge valve 132 is opened to discharge trifluoromethane. In step S112, an electrode catalyst base material 10b in which the electrode catalyst layer 10 is formed on the substrate 12 is taken out from the reactor 112. Note that, in order to make it easy to take out the electrode catalyst base material 10b, the reactor 112 may be air-cooled to room temperature before the electrode catalyst base material 10b is taken out.

A3. Advantageous Effects of Embodiment

In the manufacturing method for an electrode catalyst layer according to the present embodiment, the electrolyte resin 18 is dissolved in the supercritical trifluoromethane, which serves as a supercritical fluid, and the CNTs 14 are cooled via the substrate 12 to thereby gradually precipitate the electrolyte resin 18 on the CNTs 14. Thus, when the CNTs are long or when a distance between the adjacent CNTs is short, the electrolyte resin 18 is easily formed in the back of a gap between the adjacent CNTs. Thus, the electrolyte resin is substantially uniformly formed on the surfaces of the CNTs 14. In addition, by regulating a period of time during which the CNTs 14 are maintained at a state lower than or equal to the critical point of the supercritical trifluoromethane, the thickness (width) of the electrolyte resin 18 that coats the CNTs 14 may be easily adjusted.

In addition, in the manufacturing method for an electrode catalyst layer according to the present embodiment, the supercritical trifluoromethane is cooled to change from the supercritical state. Therefore, in comparison with the case where pressurization and decompression are repeated to precipitate the electrolyte resin 18 on the surfaces of the CNTs 14 until the electrolyte resin 18 has a desired thickness, it is possible to shorten a process period of time.

Figure 7:
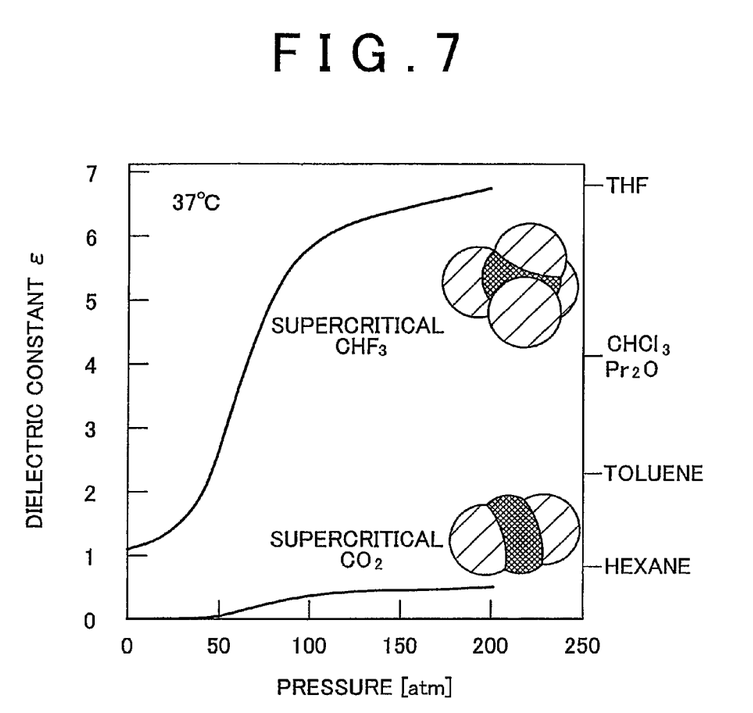
FIG. 7 is a graph that shows the dielectric constant of each of trifluoromethane and carbon dioxide.

FIG. 7 is a graph that shows the dielectric constant of each of trifluoromethane and carbon dioxide. The electrolyte resin more easily dissolves in a solvent having a high dielectric constant. As shown in FIG. 7, as the pressure of trifluoromethane increases, the trifluoromethane has an increased dielectric constant and a higher polarity, so the trifluoromethane dissolves the electrolyte resin more easily. Thus, in comparison with the case where carbon dioxide is used as a supercritical fluid, it is possible to easily dissolve (disperse) the electrolyte resin.

B. Second Embodiment

Figure 8:
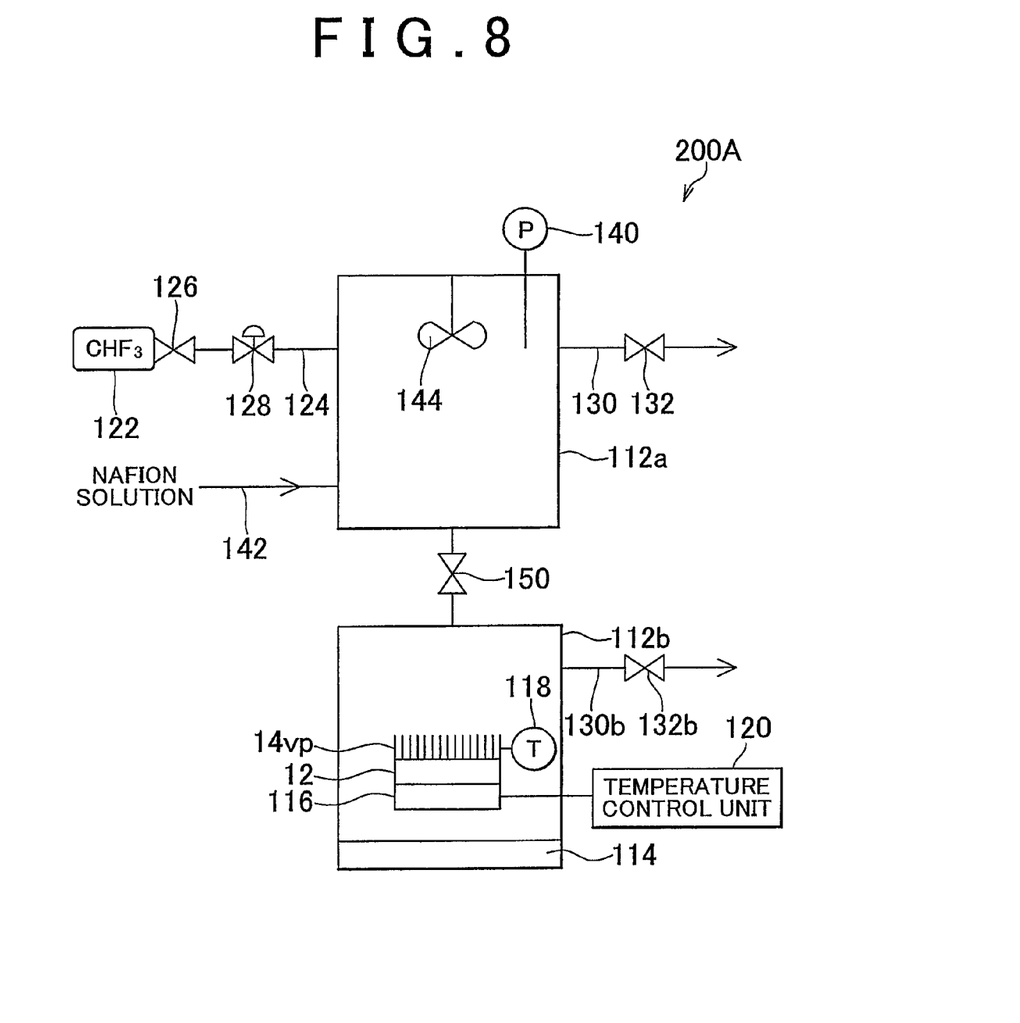
FIG. 8 is a schematic view that schematically shows a manufacturing equipment for an electrode catalyst layer according to a second embodiment.

FIG. 8 is a schematic view that schematically shows a manufacturing equipment for an electrode catalyst layer, used in a manufacturing method for an electrode catalyst layer according to a second embodiment. An electrode catalyst layer manufacturing equipment 200A according to the present embodiment mainly differs from the electrode catalyst layer manufacturing equipment 200 according to the first embodiment in that two closed containers are provided. Like reference numerals denote similar components to those of the electrode catalyst layer manufacturing equipment 200, and the description thereof is omitted.

A first closed container 112a is a container in which Nafion (trademark) that serves as electrolyte resin is dissolved in supercritical trifluoromethane to manufacture Nafion-dissolved supercritical trifluoromethane. The first closed container 112a is provided with an agitating propeller 144 for agitating fluid inside the first closed container 112a. Then, the first closed container 112a includes a trifluoromethane ($CHF_3$) supply system, a trifluoromethane discharge system, and a pressure gauge 140 as in the case of the first embodiment. The first closed container 112a further includes a Nafion solution introducing passage 142 for introducing Nafion solution 18q.

A second closed container 112b is a container in which Pt-supported vertically-aligned CNTs 14vp are immersed in the Nafion-dissolved supercritical trifluoromethane. The second closed container 112b is hermetically closed by a lid 114. The second closed container 112b includes a cooling device 116, a temperature sensor 118, a temperature control unit 120, and a trifluoromethane discharge system. The trifluoromethane discharge system includes a trifluoromethane gas discharge passage 130b and a discharge valve 132b provided in the trifluoromethane gas discharge passage 130b, as in the case of the first closed container 112a. The inside of the second closed container 112b may be made as a vacuum.

The first closed container 112a and the second closed container 112b are connected to each other via a shut-off valve 150. By opening the shut-off valve 150, Nafion-dissolved supercritical fluid produced in the first closed container 112a flows into the second closed container 112b.

Figure 9:
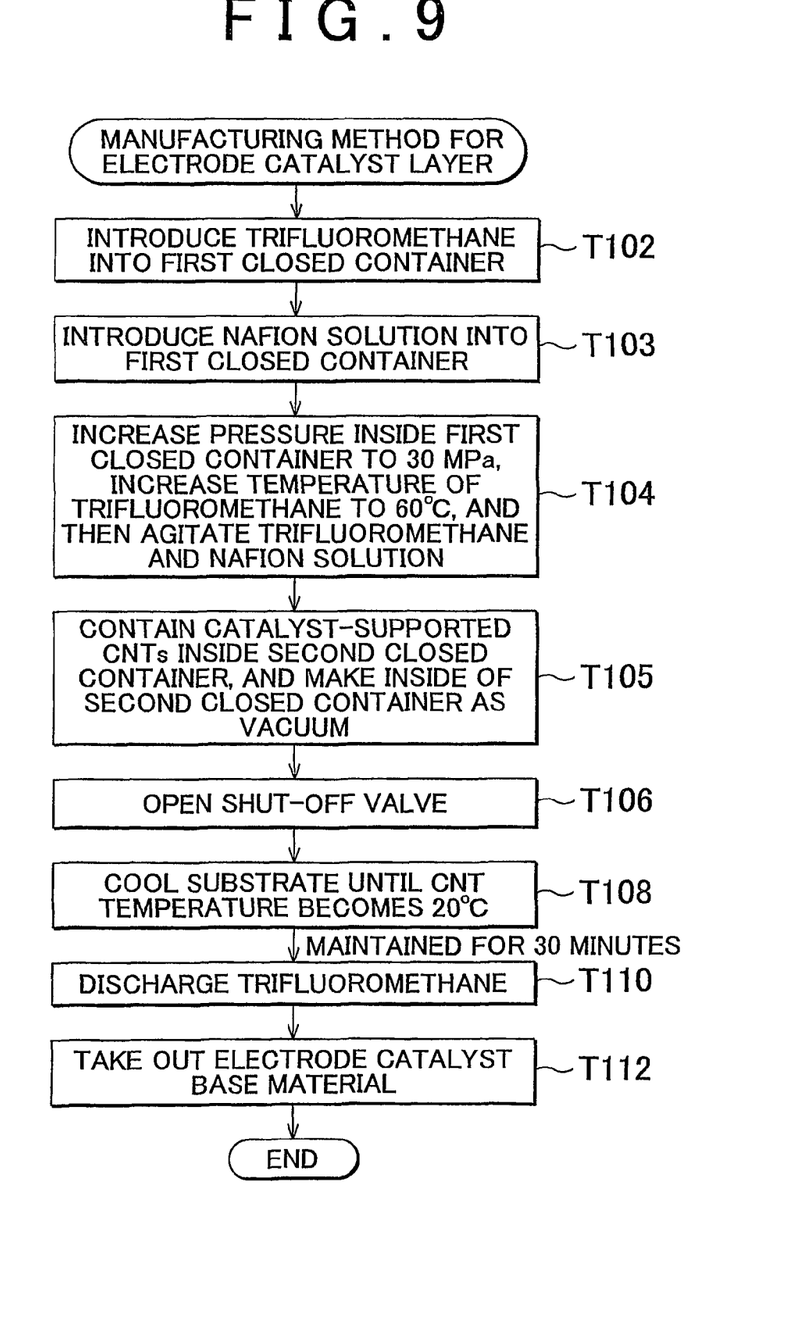
FIG. 9 is a flowchart that shows the flow of a manufacturing process for an electrode catalyst layer according to the second embodiment.

FIG. 9 is a flowchart that shows the flow of a manufacturing process for an electrode catalyst layer according to the second embodiment. In step T102, the shut-off valve 126 is opened, and the pressure regulating valve 128 is regulated to thereby introduce trifluoromethane gas into the first closed container 112a at a predetermined pressure, and the discharge valve 132 is opened to replace air inside the first closed container 112a with trifluoromethane. At this time, the shut-off valve 150 is closed. Note that, as a predetermined period of time elapses and the first closed container 112a is filled with trifluoromethane, the discharge valve 132 is closed.

In step T103, Nafion solution is introduced into the first closed container 112a via the Nafion solution introducing passage 142. In step T104, the pressure inside the first closed container 112a is increased to 30 MPa, and then the temperature of trifluoromethane is increased to 60° C. By so doing, trifluoromethane inside the first closed container 112a enters a supercritical state (becomes supercritical trifluoromethane). Then, the agitating propeller 144 is actuated to mix the Nafion solution with the supercritical trifluoromethane, thus manufacturing Nafion-dissolved supercritical trifluoromethane.

In step T105, Pt-supported vertically-aligned CNTs 14vp, in which Pt-supported CNTs 14c are substantially vertically aligned on the substrate 12, are arranged on the cooling device 116 inside the second closed container 112b. Then, the second closed container 112b is hermetically closed by the lid 114, and then the inside of the second closed container 112b is made as a vacuum.

In step T106, the shut-off valve 150 is opened. By so doing, the Nafion-dissolved supercritical trifluoromethane flows into the second closed container 112b, and the Pt-supported vertically aligned CNTs 14vp are immersed in the Nafion-dissolved supercritical trifluoromethane.

After that, as in the case of the first embodiment, until the temperature of the CNTs 14 becomes 20° C., the substrate 12 is cooled by the cooling device 116 and is maintained for 30 minutes (step T108). By so doing, the electrolyte resin (Nafion) 18 gradually precipitates on the CNTs 14 to make it possible to form an electrolyte resin layer having a desired thickness on the CNTs 14. After that, the discharge valve 132b is opened to discharge trifluoromethane (step T110), and then an electrode catalyst base material 10b in which the electrode catalyst layer 10 is formed on the substrate 12 is taken out from the second closed container 112b (step T112).

In the manufacturing method for an electrolyte resin according to the present embodiment as well, as in the case of the above described embodiment, it is possible to substantially uniformly coat the electrolyte resin 18 on the CNTs 14.

C. Alternative Embodiments

The aspect of the invention is not limited to the above described embodiments; it may be modified into various forms without departing from the scope of the invention. For example, the following alternative embodiments are possible.

(1) In the above embodiments, the vertically-aligned CNTs are exemplified as the conductive carrier. Instead, various conductive carriers may be used. For example, vertically-aligned carbon nanowalls may be used. Alternatively, a vertical nanomaterial other than carbon, such as metal oxide (titanium nitride (TiN), titanium boride (TiB), niobium trioxide ($Nb_2O_3$), zinc oxide (ZnO)), may be used. Furthermore, not a vertically-aligned carrier but a carbon material, such as carbon black, CNT, natural graphite powder, artificial graphite powder, and mesocarbon microbead (MCMB), may be used. When such a conductive carrier is used as well, as in the case of the above, electrolyte resin is dissolved in a supercritical fluid, and a substrate is cooled. Thus, the electrolyte resin is precipitated to make it possible to substantially uniformly coat the electrolyte resin on the carrier.

(2) In the above described embodiments, trifluoromethane is used as a supercritical fluid. Instead, various fluids, such as carbon dioxide, water, ammonia, hydrocarbon (for example, methane, propane) and alcohol (for example, ethanol, propanol), may be used.

(3) In the above embodiments, the Peltier device is provided as the cooling device 116. Instead, for example, a cooling device that uses refrigerant, such as water, may be used.

The invention claimed is:

1. A method for manufacturing an electrode catalyst layer, comprising:
   containing a conductive carrier on which a catalyst is supported, a substrate, an electrolyte resin, and a supercritical fluid inside a closed container, wherein the catalyst is supported on the conductive carrier prior to being introduced into the container;
   providing temperature and pressure conditions inside the closed container to place the supercritical fluid in a supercritical state above a critical point;
   dissolving the electrolyte resin in the supercritical fluid when the supercritical fluid is in the supercritical state; and
   cooling the substrate to or below the critical point and thereby changing the supercritical state of the supercritical fluid into a liquid state and thereby precipitating the electrolyte resin near the substrate to form the electrode catalyst layer on the substrate,
   wherein the electrode catalyst layer formed on the substrate comprises the conductive carrier, the catalyst supported on the conductive carrier, and the electrolyte resin wherein the supercritical fluid only around the conductive carrier is changed into the liquid state and the other supercritical fluid is maintained in the supercritical state during a period when the electrode catalyst layer is formed on the substrate.

2. The manufacturing method according to claim 1, wherein
   the conductive carrier is a vertically-aligned material that is in respect to the substrate substantially vertically formed on the substrate.

3. The manufacturing method according to claim 2, wherein
   the vertically-aligned material is a vertically-aligned carbon nanotube.

4. The manufacturing method according to claim 1, wherein
   the supercritical fluid is a supercritical fluid of trifluoromethane.

5. A manufacturing method for a membrane electrode assembly, comprising:
   transferring the electrode catalyst layer according to claim 1 onto an electrolyte membrane.

6. A method for manufacturing a fuel cell, comprising:
   arranging a reaction gas passage forming member that forms a passage for reaction gas, on each surface of the membrane electrode assembly according to claim 5.

7. The manufacturing method according to claim 1, wherein the conductive carrier is an electrical conductive carrier.

\* \* \* \* \*

UNITED STATES PATENT AND TRADEMARK OFFICE
CERTIFICATE OF CORRECTION

PATENT NO. : 8,790,849 B2  Page 1 of 1
APPLICATION NO. : 13/318383
DATED : July 29, 2014
INVENTOR(S) : Yuichiro Hama et al.

It is certified that error appears in the above-identified patent and that said Letters Patent is hereby corrected as shown below:

In the Claims

Col. 10, claim 1, lines 40-41, "resin wherein" should read --resin, and wherein--.

Signed and Sealed this
Sixth Day of January, 2015

Michelle K. Lee
*Deputy Director of the United States Patent and Trademark Office*